(12) United States Patent
Vickery et al.

(10) Patent No.: US 12,225,896 B2
(45) Date of Patent: *Feb. 18, 2025

(54) WEIGHTED RODENT BAIT STATIONS AND RELATED METHODS

(71) Applicant: VM Products, Inc., Bedford, TX (US)

(72) Inventors: Ethan Vickery, Colleyville, TX (US); Larry Covington, Weatherford, TX (US)

(73) Assignee: VM PRODUCTS INC., Bedford, TX (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/320,747

(22) Filed: May 19, 2023

(65) Prior Publication Data

US 2024/0130355 A1 Apr. 25, 2024
US 2024/0224985 A9 Jul. 11, 2024

Related U.S. Application Data

(63) Continuation of application No. 17/305,178, filed on Jul. 1, 2021, now Pat. No. 11,690,371, which is a continuation of application No. 16/512,540, filed on Jul. 16, 2019, now Pat. No. 11,051,506, which is a continuation of application No. 15/808,302, filed on Nov. 9, 2017, now Pat. No. 10,390,527, which is a (Continued)

(51) Int. Cl.
| | | |
|---|---|---|
| A01M 25/00 | (2006.01) |
| B65D 43/16 | (2006.01) |
| B65D 71/00 | (2006.01) |
| B65D 71/06 | (2006.01) |
| E05B 19/00 | (2006.01) |
| E05B 35/00 | (2006.01) |
| E05B 65/00 | (2006.01) |

(52) U.S. Cl.
CPC ......... A01M 25/004 (2013.01); B65D 43/162 (2013.01); B65D 71/0096 (2013.01); B65D 71/063 (2013.01); E05B 19/00 (2013.01); E05B 35/008 (2013.01); E05B 65/00 (2013.01); E05B 65/006 (2013.01)

(58) Field of Classification Search
CPC .................. A01M 25/004; B65D 71/0096
See application file for complete search history.

(56) References Cited

U.S. PATENT DOCUMENTS

| | | |
|---|---|---|
| 524,894 A | 8/1894 | Forsberg |
| 759,030 A | 5/1904 | Sheaffer |

(Continued)

FOREIGN PATENT DOCUMENTS

| | | |
|---|---|---|
| DE | 3140658 | 4/1983 |
| DE | 10207916 | 4/2003 |

(Continued)

OTHER PUBLICATIONS

"Protecta Mouse Bait Station Features," RTU Mouse Bait Stations, hap://www.rodentcontrols.corn/mouse-bait-statiorts-rtu.htm, published Jun. 2004.

(Continued)

*Primary Examiner* — Christopher P Ellis
(74) *Attorney, Agent, or Firm* — Norton Rose Fulbright US LLP

(57) ABSTRACT

Rodent bait station assemblies and methods for assembly and bundling.

15 Claims, 14 Drawing Sheets

Related U.S. Application Data continuation of application No. 15/212,754, filed on Jul. 18, 2016, now Pat. No. 9,826,730, which is a continuation of application No. 14/663,655, filed on Mar. 20, 2015, now Pat. No. 9,392,784, which is a continuation of application No. 14/011,637, filed on Aug. 27, 2013, now Pat. No. 8,997,396, which is a continuation of application No. 13/533,747, filed on Jun. 26, 2012, now Pat. No. 8,516,740, which is a continuation of application No. 13/013,665, filed on Jan. 25, 2011, now Pat. No. 8,209,900, which is a continuation of application No. 12/186,436, filed on Aug. 5, 2008, now Pat. No. 7,874,098.

(56) References Cited

U.S. PATENT DOCUMENTS

| | | |
|---|---|---|
| RE14,782 E | 12/1919 | Hedrich et al. |
| 1,443,287 A | 1/1923 | Snyder et al. |
| 1,729,389 A | 9/1929 | Hughett |
| 2,569,833 A | 10/1951 | Simpson |
| 2,710,485 A | 6/1955 | Starr |
| 2,736,127 A | 2/1956 | McCann |
| 2,750,707 A | 6/1956 | Ekstedt |
| 2,784,577 A | 3/1957 | Beaham |
| 2,837,861 A | 6/1958 | Graham |
| 2,896,361 A | 7/1959 | Allen |
| 2,950,562 A | 8/1960 | Lothrop |
| 2,953,868 A | 9/1960 | Chambers |
| 3,271,894 A | 9/1966 | Manno et al. |
| 3,303,600 A | 2/1967 | Freeman |
| 3,318,039 A | 5/1967 | MacDonald et al. |
| 3,319,373 A | 5/1967 | Gale et al. |
| 3,343,744 A | 9/1967 | Morell et al. |
| 3,427,743 A | 2/1969 | Brunner et al. |
| 3,471,114 A | 10/1969 | Bal |
| 3,488,879 A | 1/1970 | Laughlin |
| 3,704,539 A | 12/1972 | Alvarez |
| 3,708,905 A | 1/1973 | Jalbert |
| D227,563 S | 7/1973 | Torchia |
| 3,821,861 A | 7/1974 | Jalbert |
| 3,978,607 A | 9/1976 | Piere |
| 3,992,804 A | 11/1976 | Senese |
| 4,026,064 A | 5/1977 | Baker |
| 4,030,230 A | 6/1977 | Souza |
| 4,182,070 A | 1/1980 | Connelly |
| 4,208,829 A | 6/1980 | Manning |
| 4,216,640 A | 8/1980 | Kaufman |
| 4,226,042 A | 10/1980 | Gilbert |
| 4,270,299 A | 6/1981 | Long |
| 4,277,907 A | 7/1981 | Ernest |
| 4,328,637 A | 5/1982 | Eichmuller et al. |
| 4,349,982 A | 9/1982 | Sherman |
| 4,387,552 A | 6/1983 | Lancaster |
| 4,398,643 A | 8/1983 | Conlon |
| 4,400,904 A | 8/1983 | Baker |
| 4,407,427 A | 10/1983 | Reuter |
| D271,231 S | 11/1983 | Stout |
| 4,418,493 A | 12/1983 | Jordan |
| 4,438,606 A | 3/1984 | Chardon et al. |
| 4,453,337 A | 6/1984 | Williams |
| 4,485,582 A | 12/1984 | Morris |
| 4,486,973 A | 12/1984 | Faucillon |
| 4,521,987 A | 6/1985 | Knote |
| 4,541,198 A | 9/1985 | Sherman |
| D281,231 S | 11/1985 | Cochran |
| 4,570,377 A | 2/1986 | Primavera |
| 4,574,519 A | 3/1986 | Eckebrecht |
| 4,611,426 A | 9/1986 | Willis |
| 4,619,071 A | 10/1986 | Willis |
| 4,648,201 A | 3/1987 | Sherman |
| 4,660,320 A | 4/1987 | Baker et al. |
| 4,730,411 A | 3/1988 | Katis |
| 4,753,032 A | 6/1988 | Sherman |
| 4,765,579 A | 8/1988 | Robbins, III et al. |
| 4,833,819 A | 5/1989 | Sherman |
| 4,835,902 A | 6/1989 | Sherman |
| 4,870,780 A | 10/1989 | Sherman |
| 4,872,582 A | 10/1989 | Sipple |
| 4,874,103 A | 10/1989 | Quisenberry et al. |
| 4,905,407 A | 3/1990 | Sherman |
| 5,004,114 A | 4/1991 | Terbrusch et al. |
| 5,014,943 A | 5/1991 | Nelson et al. |
| 5,038,516 A | 8/1991 | Doucette |
| 5,040,327 A | 8/1991 | Stack et al. |
| 5,085,030 A | 2/1992 | Segawa et al. |
| 5,105,972 A | 4/1992 | Waterston et al. |
| 5,131,184 A | 7/1992 | Harrison |
| 5,136,803 A | 8/1992 | Sykes et al. |
| 5,150,810 A | 9/1992 | Loebbert |
| 5,152,420 A | 10/1992 | Bird et al. |
| 5,174,462 A | 12/1992 | Hames |
| 5,184,836 A | 2/1993 | Andrews, Jr. et al. |
| 5,272,832 A | 12/1993 | Marshall et al. |
| 5,295,607 A | 3/1994 | Chang |
| D354,690 S | 1/1995 | Butler et al. |
| 5,379,545 A | 1/1995 | Gall |
| 5,385,258 A | 1/1995 | Sutherlin |
| 5,405,041 A | 4/1995 | Van Brackle |
| 5,419,453 A | 5/1995 | Lochridge |
| 5,446,992 A | 9/1995 | Stewart |
| 5,448,852 A | 9/1995 | Spragins et al. |
| 5,458,259 A | 10/1995 | Falk |
| 5,503,292 A | 4/1996 | Cucchiara |
| 5,513,465 A | 5/1996 | Demarest et al. |
| 5,549,214 A | 8/1996 | Harris |
| D374,704 S | 10/1996 | Rimback |
| 5,806,237 A | 9/1998 | Nelson et al. |
| 5,839,220 A | 11/1998 | Wass |
| 5,848,692 A | 12/1998 | Thorne et al. |
| 5,873,193 A | 2/1999 | Jensen |
| 5,897,018 A | 4/1999 | Pruitt |
| 5,943,814 A | 8/1999 | Bartlett, Jr. |
| 5,953,853 A | 9/1999 | Kim |
| 5,953,854 A | 9/1999 | Hyatt |
| 5,966,863 A | 10/1999 | Payton et al. |
| 5,987,811 A | 11/1999 | Wiesener et al. |
| 6,050,419 A | 4/2000 | Flanagan et al. |
| 6,058,646 A | 5/2000 | Bisoff et al. |
| 6,082,042 A | 7/2000 | Issitt |
| 6,152,305 A | 11/2000 | Green |
| 6,155,002 A | 12/2000 | Holder |
| 6,158,166 A | 12/2000 | Snell et al. |
| 6,219,960 B1 | 4/2001 | Contadini et al. |
| 6,234,339 B1 | 5/2001 | Thomas |
| 6,247,592 B1 | 6/2001 | Racicot et al. |
| 6,267,079 B1 | 7/2001 | Eby |
| 6,343,434 B1 | 2/2002 | Petti |
| 6,378,243 B1 | 4/2002 | Snell et al. |
| 6,397,517 B1 | 6/2002 | Leyerle |
| 6,401,384 B1 | 6/2002 | Contadini et al. |
| 6,446,930 B1 | 9/2002 | Li |
| 6,470,622 B1 | 10/2002 | Braun |
| 6,474,016 B2 | 11/2002 | Snell et al. |
| 6,493,988 B1 | 12/2002 | Johnson |
| 6,508,377 B1 | 1/2003 | Griswold et al. |
| 6,511,033 B2 | 1/2003 | Li |
| 6,513,281 B2 | 2/2003 | Roberts |
| 6,513,283 B1 | 2/2003 | Crossen |
| 6,618,983 B1 | 9/2003 | Spragins |
| 6,637,717 B2 | 10/2003 | Li |
| 6,644,493 B1 | 11/2003 | Walton et al. |
| 6,671,999 B1 | 1/2004 | Doucette |
| 6,672,000 B2 | 1/2004 | Aesch, Jr. |
| D486,203 S | 2/2004 | Stephen |
| 6,718,687 B2 | 4/2004 | Robison |
| 6,722,080 B2 | 4/2004 | Carter |
| 6,725,627 B2 | 4/2004 | Weder et al. |
| 6,729,067 B2 | 5/2004 | Lund et al. |
| 6,775,595 B1 | 8/2004 | Yabutani et al. |
| 6,786,349 B2 | 9/2004 | Najd |
| 6,789,351 B2 | 9/2004 | Chrestman |
| 6,792,713 B2 | 9/2004 | Snell |
| 6,807,768 B2 | 10/2004 | Johnson et al. |

(56) References Cited

U.S. PATENT DOCUMENTS

| | | | |
|---|---|---|---|
| D498,286 S | 11/2004 | Loerakker et al. | |
| 6,860,062 B2 | 3/2005 | Spragins | |
| 6,874,274 B2 | 4/2005 | Townsend | |
| 6,901,694 B1 | 6/2005 | Neault et al. | |
| 6,910,300 B1 | 6/2005 | Warren | |
| 6,981,680 B1 | 1/2006 | Gordon et al. | |
| 7,165,353 B2 | 1/2007 | Matts et al. | |
| 7,165,354 B1 | 1/2007 | Rickenbacker | |
| 7,213,869 B1 | 5/2007 | McClellan | |
| 7,377,072 B2 | 5/2008 | Meier et al. | |
| 7,513,476 B1 | 4/2009 | Huang | |
| 7,634,894 B2 | 12/2009 | Yohe et al. | |
| 7,647,723 B2 | 1/2010 | Klein et al. | |
| 7,669,363 B2 | 3/2010 | Frisch | |
| 7,735,258 B2 | 6/2010 | Vickery | |
| 7,861,865 B2 | 1/2011 | Green | |
| 7,874,098 B2 * | 1/2011 | Vickery | B65D 43/162 43/131 |
| 7,874,436 B2 | 1/2011 | Hought | |
| 8,028,468 B1 * | 10/2011 | Walsh | A01M 25/004 43/131 |
| 8,209,900 B2 | 7/2012 | Vickery et al. | |
| 11,051,506 B2 * | 7/2021 | Vickery | E05B 65/006 |
| 11,425,898 B2 * | 8/2022 | Lykken | A01M 25/004 |
| 2001/0040208 A1 | 11/2001 | Li | |
| 2002/0043018 A1 | 4/2002 | Townsend | |
| 2003/0038141 A1 | 2/2003 | Landsberger | |
| 2003/0116569 A1 | 6/2003 | Mercier | |
| 2004/0094558 A1 | 5/2004 | Najd | |
| 2004/0181996 A1 | 9/2004 | Johnson et al. | |
| 2004/0195250 A1 | 10/2004 | Fripps | |
| 2004/0244274 A1 | 12/2004 | Dellevigne et al. | |
| 2005/0017148 A1 | 1/2005 | Tung | |
| 2005/0028431 A1 | 2/2005 | Hoyes | |
| 2005/0097808 A1 | 5/2005 | Vorhies et al. | |
| 2005/0102887 A1 | 5/2005 | Lang et al. | |
| 2005/0132637 A1 | 6/2005 | Deakins | |
| 2005/0198893 A1 | 9/2005 | Bernard et al. | |
| 2005/0235553 A1 | 10/2005 | Rail | |
| 2006/0117644 A1 | 6/2006 | Hoyes et al. | |
| 2006/0242890 A1 | 11/2006 | Ethan | |
| 2006/0265944 A1 | 11/2006 | Meier et al. | |
| 2008/0072475 A1 | 3/2008 | Nelson et al. | |
| 2008/0196361 A1 | 8/2008 | Weimer | |
| 2008/0302000 A1 | 12/2008 | Kidder | |
| 2009/0056199 A1 | 3/2009 | Reed | |
| 2009/0094884 A1 | 4/2009 | Cink | |
| 2009/0139133 A1 | 6/2009 | Harper | |
| 2009/0166235 A1 | 7/2009 | Månsson et al. | |
| 2009/0229170 A1 | 9/2009 | Gaibotti | |
| 2009/0307963 A1 | 12/2009 | Abbas | |
| 2010/0031557 A1 | 2/2010 | Vickery et al. | |
| 2010/0050498 A1 | 3/2010 | Nelson et al. | |
| 2010/0170141 A1 | 7/2010 | Cink et al. | |
| 2010/0251598 A1 | 10/2010 | Vickery et al. | |
| 2010/0313466 A1 | 12/2010 | Vickery | |
| 2010/0325940 A1 | 12/2010 | Pryor et al. | |
| 2011/0219666 A1 | 9/2011 | Vickery et al. | |
| 2019/0350190 A1 * | 11/2019 | Polenick | A01M 23/00 |

FOREIGN PATENT DOCUMENTS

| | | |
|---|---|---|
| EP | 442190 | 1/1994 |
| EP | 599755 | 6/1994 |
| EP | 745323 | 12/1996 |
| EP | 1201124 | 5/2002 |
| EP | 1234502 | 8/2002 |
| EP | 1350430 | 10/2003 |
| EP | 1459625 | 9/2004 |
| EP | 2100504 | 9/2009 |
| FR | 2268464 | 12/1975 |
| FR | 2331281 | 7/1977 |
| FR | 2398454 | 3/1979 |
| FR | 2855720 | 12/2004 |
| GB | 2249249 | 5/1992 |
| GB | 2269306 | 2/1994 |
| GB | 2384966 | 8/2003 |
| JP | 2009159938 | 7/2009 |
| WO | WO 1998/010645 | 3/1998 |
| WO | WO 1999/003340 | 1/1999 |
| WO | WO 2001/037651 | 5/2001 |
| WO | WO 2002/013604 | 2/2002 |
| WO | WO 2002/102147 | 12/2002 |
| WO | WO 2003/009683 | 2/2003 |
| WO | WO 2003/045138 | 6/2003 |
| WO | WO 2004/084625 | 10/2004 |
| WO | WO 2005/006857 | 1/2005 |
| WO | WO 2007/147550 | 12/2007 |
| WO | WO 2008/035304 | 3/2008 |
| WO | WO 2010/017306 | 2/2010 |
| WO | WO 2010/033908 | 3/2010 |
| WO | WO 2010/151730 | 12/2010 |

OTHER PUBLICATIONS

"Rodent Bait Stations," accessed from http://store.doyourownpestcontrol.com/Catalog/Rat-Rodent-Control-Products on Jan. 13, 2011.

Morris et al., "Comparative evaluation of tamper-proof mouse bait station," Proceedings of the Thirteenth Vertebrate Pest Conference, 1988.

Notice of Allowance issued in U.S. Appl. No. 12/186,436, dated Sep. 15, 2010.

Notice of Allowance, issued in U.S. Appl. No. 10/550,378, mailed Mar. 16, 2010.

Notice to Manufacturers, Formulators Registrants and Users of Pesticides, United States Environmental Protection Agency, Washington D.C., Sep. 16, 1994.

Office Action issued in U.S. Appl. No. 13/013,665, dated Aug. 29, 2011.

Office Action, issued in U.S. Appl. No. 10/550,378, mailed Aug. 21, 2007.

Office Action, issued in U.S. Appl. No. 10/550,378, mailed Sep. 19, 2008.

Office Action, issued in U.S. Appl. No. 10/550,378, mailed Feb. 18, 2009.

Office Action, issued in U.S. Appl. No. 10/550,378, mailed Jul. 8, 2009.

Office Action, issued in U.S. Appl. No. 10/550,378, mailed Nov. 12, 2009.

Office Action, issued in U.S. Appl. No. 11/786,355, mailed Jul. 14, 2009.

Office Action, issued in U.S. Appl. No. 11/786,355, mailed Jan. 19, 2010.

Office Action, issued in U.S. Appl. No. 11/786,355, mailed Aug. 18, 2010.

Office Action, issued in U.S. Appl. No. 11/786,355, mailed Apr. 15, 2011.

Office Action, issued in U.S. Appl. No. 12/816,300, dated Aug. 25, 2011.

Office Action, issued in U.S. Appl. No. 12/816,306, dated Jun. 28, 2011.

Office Action, issued in U.S. Appl. No. 12/816,306, dated Sep. 30, 2010.

Office Action, issued in U.S. Appl. No. 12/816,315, mailed Sep. 30, 2010.

Office Action, issued in U.S. Appl. No. 12/816,315, mailed Jun. 15, 2011.

PCT International Search Report and Written Opinion, issued in International Application No. PCT/2009/052868, mailed Apr. 28, 2010.

PCT International Search Report, issued in International application No. PCT/US2009/056246, mailed Jun. 25, 2010.

PCT Invitation to Pay Additional Fees, in Int. App. No. PCT/US2009/052868, mailed Mar. 4, 2010.

Response to Office Action, issued in U.S. Appl. No. 12/816,315, dated Mar. 30, 2011.

Response to Office Action, issued in U.S. Appl. No. 12/816,306, dated Mar. 30, 2011.

(56) References Cited

OTHER PUBLICATIONS

Response to Office Action, submitted in U.S. Appl. No. 10/550,378, dated Jun. 27, 2008.
Response to Office Action, submitted in U.S. Appl. No. 10/550,378, dated Dec. 9, 2008.
Response to Office Action, submitted in U.S. Appl. No. 10/550,378, dated May 13, 2009.
Response to Office Action, submitted in U.S. Appl. No. 10/550,378, dated Aug. 26, 2009.
Response to Office Action, submitted in U.S. Appl. No. 10/550,378, dated Feb. 12, 2010.
Response to Office Action, submitted in U.S. Appl. No. 10/550,378, dated Oct. 25, 2007.
Response to Office Action, submitted in U.S. Appl. No. 11/786,355, dated Nov. 17, 2009.
Response to Office Action, submitted in U.S. Appl. No. 11/786,355, dated May 24, 2010.
Response to Office Action, submitted in U.S. Appl. No. 13/013,665, dated Feb. 29, 2012.
Spurr et al., "Bait station preferences of Norway rats," Doc Research & Development Series 255, 2006.
Supplemental Response to Office Action, submitted in U.S. Appl. No. 10/550,378, dated May 13, 2009.

* cited by examiner

WEIGHTED RODENT BAIT STATIONS AND RELATED METHODS

CROSS-REFERENCE TO RELATED APPLICATIONS

This application is a continuation of U.S. patent application Ser. No. 17/305,178, filed Jul. 1, 2021, which is a continuation of U.S. patent application Ser. No. 16/512,540, filed Jul. 16, 2019, now U.S. Pat. No. 11,051,506, which is a continuation of U.S. patent application Ser. No. 15/808,302, filed Nov. 9, 2017, now U.S. Pat. No. 10,390,527, which is a continuation of U.S. patent application Ser. No. 15/212,754 filed Jul. 18, 2016, now U.S. Pat. No. 9,826,730, which is a continuation of U.S. patent application Ser. No. 14/663,655 filed Mar. 20, 2015, now U.S. Pat. No. 9,392,784, which is a continuation of U.S. patent application Ser. No. 14/011,637 filed Aug. 27, 2013, now U.S. Pat. No. 8,997,396, which is a continuation of U.S. patent application Ser. No. 13/533,747 filed Jun. 26, 2012, now U.S. Pat. No. 8,516,740, which is a continuation of U.S. patent application Ser. No. 13/013,665 filed Jan. 25, 2011, now U.S. Pat. No. 8,209,900, which is a continuation of U.S. patent application Ser. No. 12/186,436 filed Aug. 5, 2008, now U.S. Pat. No. 7,874,098, each of which are incorporated herein in their entireties.

BACKGROUND

The present methods, devices, and systems relate generally to the field of rodent bait stations.

SUMMARY

Some embodiments of the present rodent bait station assemblies have a bait station fixed to an anchoring base by one or more fastening members that are respectively coupled to one or more frusto-conically shaped attachment pieces that are each in contact with the anchoring base. In some embodiments, the attachment pieces may be frusto-conically shaped fastening plugs that are respectively in contact with the one or more fastening members.

In some embodiments of the present rodent bait station assemblies, the anchoring base may comprise ceramic or concrete. Some embodiments include bait stations that are configured with a lid. Some of these embodiments include a removable key, and are configured such that the lid can be unlocked from the bait station using the key.

Some embodiments of the present rodent bait station assemblies have a base portion and a lid that is integrally attached to the base portion. Some of these embodiments include a removable key, and are configured such that the lid can be unlocked from the bait station using the key.

Some embodiments of the present rodent bait station assemblies contain bait located within the bait station. Some of these embodiments also include bait-holding rods that couple the bait to the bait station.

In some embodiments of the present rodent bait station assemblies, the attachment pieces contain plastic. In some embodiments, the attachment pieces are part of an attachment tray. In some of these embodiments, the fastening members are coupled to the attachment pieces using frusto-conically shaped fastening plugs that are in contact with the fastening members and with the attachment pieces.

Some embodiments of the present rodent bait station assemblies have fastening members that are self-tapping screws.

Some embodiments of the present rodent bait station assemblies have a bait station, an anchoring base, an attachment piece, and a fastening member that is in contact with the bait station and is coupled to the attachment piece. In these embodiments, the anchoring base may include an anchoring base top surface having a portion that is in contact with the bait station, and an anchoring base attachment surface that are is not parallel to the anchoring base top surface. In these embodiments, the attachment piece may be in contact with the anchoring base attachment surfaces.

In these embodiments, the anchoring base may fixed to the bait station by a compressive force that is normal to the anchoring base top surface. The compressive force may be applied to the anchoring base by the attachment piece.

In these embodiments, the attachment piece may not be integral to the anchoring base prior to coupling the fastening member to the attachment piece. In other words, prior to coupling fastening member to the attachment piece, the attachment piece may be separable from the anchoring base.

Some embodiments of the present rodent bait station assemblies include features that prevent rotation of the attachment piece during coupling to the fastening member. Such anti-rotational features may include, for example, a configuration having a slightly eccentric radial cross-section (e.g., an oblong-shaped cross-section) of a generally frusto-conical attachment surface of the anchoring base. When such a configuration is coupled to a frusto-conical fastening plug serving as the attachment piece, the fastening plug may deform to comply with the eccentric cross-section of the attachment surface, thereby limiting the rotation of fastening plug.

In some embodiments of the present rodent bait station assemblies, the anchoring base includes an anchoring base bottom surface that is substantially parallel and opposite the anchoring base top surface. In these embodiments, the anchoring base bottom surface may have indented features, such as, for example, channels or grid-like impressions. The term "substantially parallel" in this respect means that the magnitude of the angle between the surface normals is about ten degrees or less.

In some embodiments of the present rodent bait station assemblies, projecting the outer perimeter of the anchoring base onto the plane of the anchoring base attachment surface circumscribes an area that is about 110% or less than the area circumscribed by projecting the outer perimeter of the bait station onto the plane of the anchoring base attachment surface.

In some embodiments of the present rodent bait station assemblies, the shape resulting from projecting the outer perimeter of the anchoring base onto the plane of the anchoring base attachment surface is substantially the same as the shape resulting from projecting the outer perimeter of the bait station onto the plane of the anchoring base attachment surface. The term "substantially the same" in this respect means that the two shapes can be aligned such that the offset between the two shapes (e.g., for any given point on either shape, the shortest distance to a point on the other shape) does not deviate by more then 10% from the median offset between the two shapes.

Embodiments of the present rodent bait station packaged bundle contain a packaging container and a bait station assembly having a bait station fixed to an anchoring base. In these embodiments, the bait station assembly may be within the packaging container.

Some embodiments of the present rodent bait station packaged bundle include bait located within the bait station.

In some of these embodiments, the bait is coupled to the bait station using bait-holding rods.

In some embodiments of the present rodent bait station packaged bundle, the packaging container is paper. Some embodiments of the packaging container are paperboard, corrugated fiberboard, or plastic.

Embodiments of the present shipping bundles include a transport pallet, rodent bait station assemblies, and a plastic film wrapped around a portion of the plurality of rodent bait station assemblies to secure the rodent bait station assemblies to the transport pallet and restrict movement of rodent bait station assemblies relative to each other.

Some embodiments of the present shipping bundles include bait located within the bait station. In some of these embodiments, bait-holding rods couple the bait to the bait station.

Some embodiments of the present shipping bundles include a strap securing the rodent bait station assemblies to the transport pallet.

Embodiments of the present methods for assembling a rodent bait station assembly include the steps of positioning a base attachment piece in a fixture, positioning an anchoring base over the base attachment piece so that the base attachment piece contacts an anchoring base attachment surface of the anchoring base, positioning a bait station on the anchoring base such that an attachment position of the bait station aligns with the attachment piece, and fixing the anchoring base to the bait station by positioning a fastening member at the attachment position and coupling the fastening member to the base attachment piece.

Embodiments of the present methods for bundling a plurality of rodent bait station assemblies includes the steps of placing a plurality of rodent bait station assemblies on a transport pallet, and wrapping a plastic film around a portion of the plurality of rodent bait station assemblies to secure the rodent bait station assemblies to the transport pallet and restrict movement of rodent bait station assemblies relative to each other. In these embodiments each rodent bait station assembly may include a bait station fixed to an anchoring base.

Any embodiment of any of the present methods, devices, and systems may consist of or consist essentially of—rather than comprise/include/contain/have—the described functions, steps and/or features. Thus, in any of the claims, the term "consisting of" or "consisting essentially of" may be substituted for any of the open-ended linking verbs recited above, in order to change the scope of a given claim from what it would otherwise be using the open-ended linking verb.

BRIEF DESCRIPTION OF THE DRAWINGS

The following drawings illustrate by way of example and not limitation. Identical reference numerals do not necessarily indicate an identical structure, system, or display. Rather, the same reference numeral may be used to indicate a similar feature or a feature with similar functionality. Every feature of each embodiment is not always labeled in every figure in which that embodiment appears, in order to keep the figures clear.

FIGS. 1A and 1B depict perspective views of embodiments of the present rodent bait station assemblies. FIG. 1B depicts an embodiment having an attachment tray.

FIGS. 2A and 2B depict exploded perspective views of embodiments of the present rodent bait station assemblies. FIG. 2B depicts an embodiment having an attachment tray.

FIGS. 5A and 5B illustrate the interior of embodiments of the present bait stations. Bait and bait-holding rods are depicted.

FIG. 6 is a cross-sectional view of an embodiment of the present rodent bait station assemblies having an attachment tray.

FIG. 7 is a bottom view of an embodiment of the present rodent bait station assemblies that does not have an attachment tray.

DESCRIPTION OF ILLUSTRATIVE EMBODIMENTS

Figure 1A:
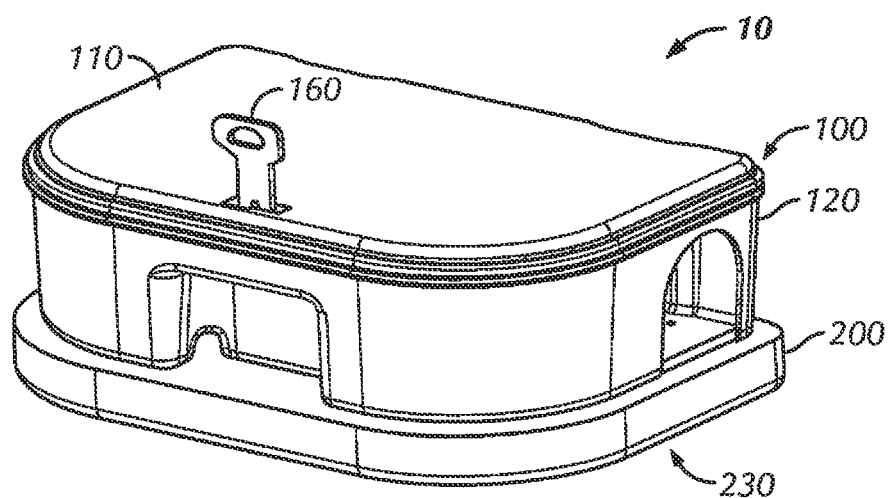
FIGS. 1A, 1B, 2A, 2B, 5A, 5B, 6, and 7 are drawn to scale, meaning the sizes of the depicted elements are accurate relative to each other.
Figure 1B:
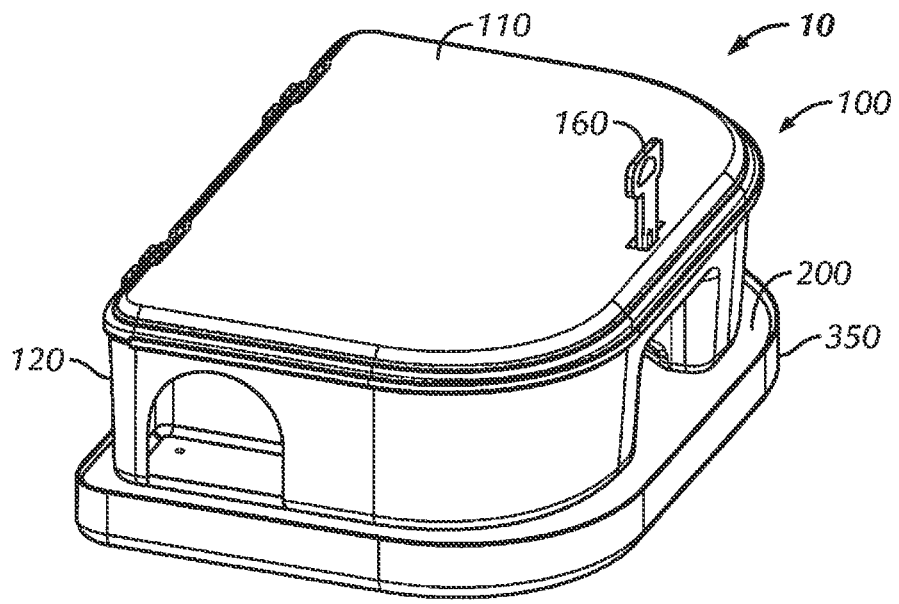
Figure 2A:
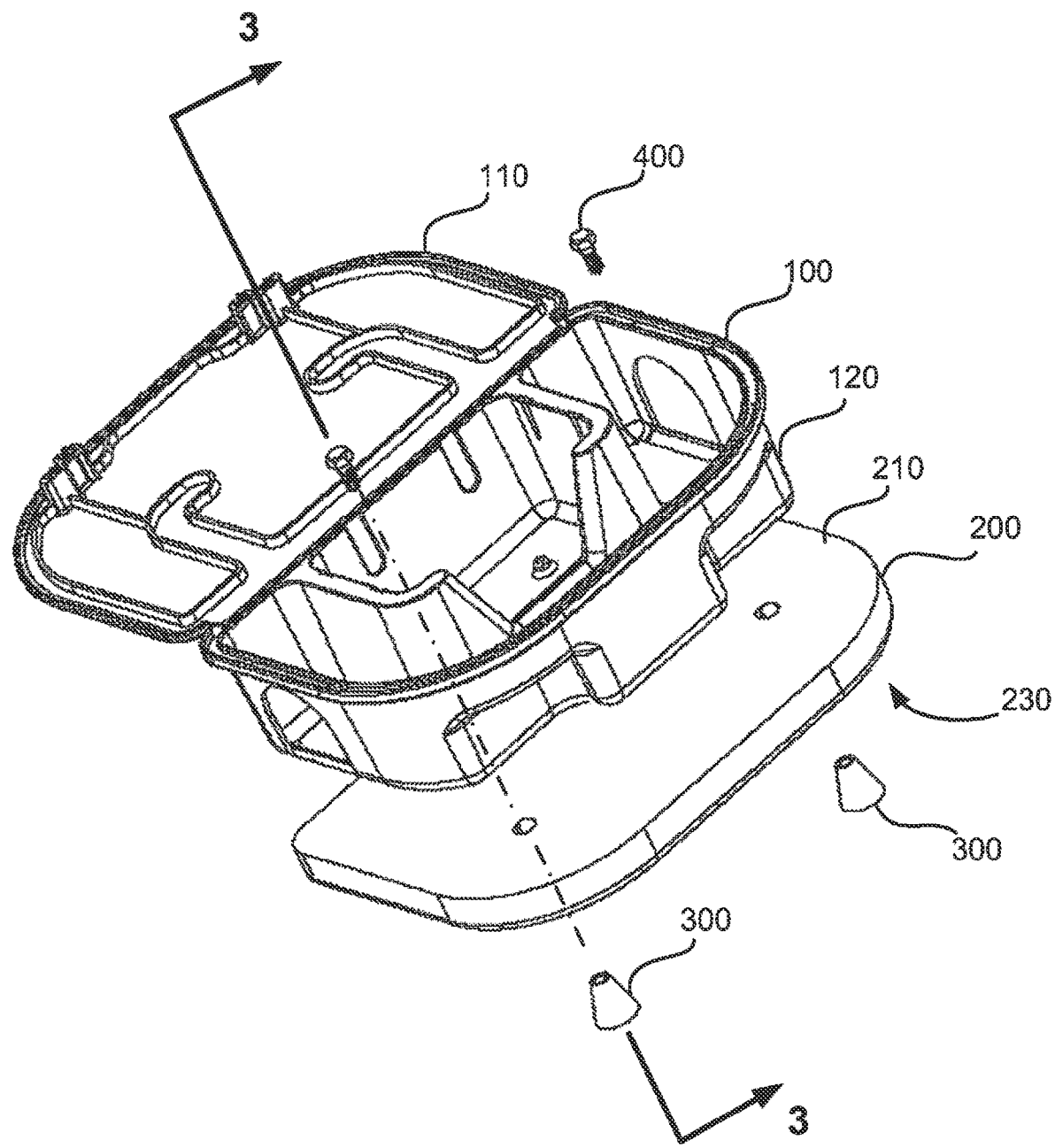
Figure 2B:
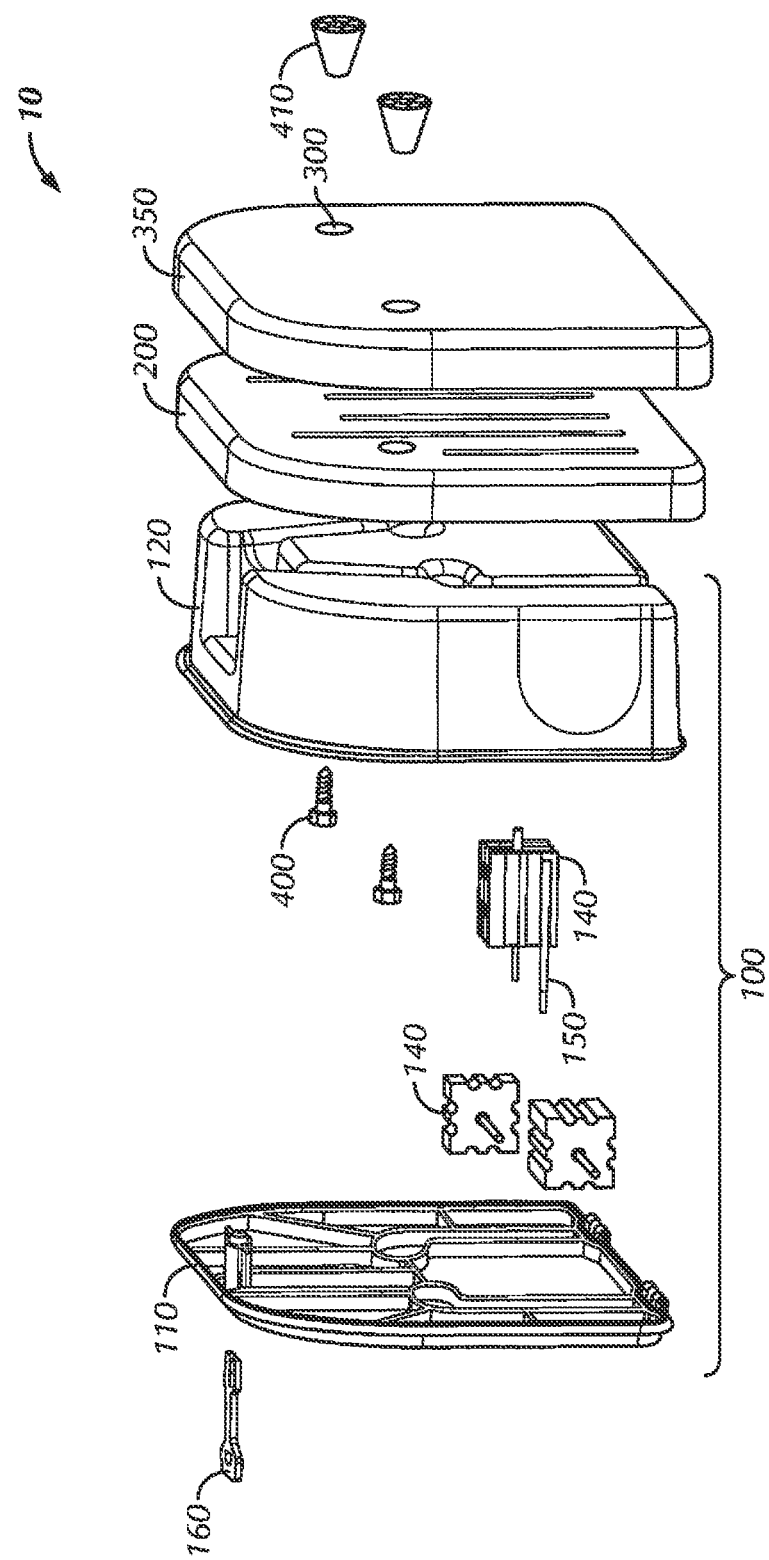

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. Thus, a method comprising certain steps is a method that includes at least the recited steps, but is not limited to only possessing the recited steps. Likewise, a device or system comprising certain elements includes at least the recited elements, but is not limited to only possessing the recited elements.

The terms "a" and "an" are defined as one or more than one, unless this disclosure expressly requires otherwise. The term "another" is defined as at least a second or more.

In one aspect, the present disclosure provides embodiments that are rodent bait station assemblies. In another aspect, the present disclosure provides embodiments that are rodent bait station packaged bundles that include embodiments of the rodent bait station assemblies. Another aspect of the present disclosure provides shipping bundles that include a plurality of embodiments of the rodent bait station assemblies. Yet another aspect of the present disclosure provides methods for assembling rodent bait station assemblies.

Embodiments of the present rodent bait station assemblies are depicted in FIGS. 1A-7. Rodent bait station assembly 10 includes bait station 100 fixed to anchoring base 200 by attachment piece 300 and fastening member 400. Anchoring base 200 provides rodent bait station assembly 10 with additional stability compared to an implementation having bait station 100 alone. Bait station 100 is typically formed from plastic (through, for example, injection molding techniques), but may alternately be fabricated from other materials or combinations of materials. Anchoring base 200 may be very heavy relative to bait station 100, and may be fabricated from materials such as concrete. The concrete may be formed using a vertical mixer that drops a shot of concrete into a form that is then shaken to achieve the desired shape, after which multiple bases can be cured together using any suitable technique. An example of suitable concrete for making bases 200 can be created using a 5 sack mix that yields about 4000 psi (pounds per square inch) concrete; the amount of water in the mix can be minimized and any resulting slump also kept to a minimum. A die or dies can be added to the concrete to achieve a desired color for the base. Soap in the form of an admixture may also be added, such as those that are available from Grace Construction Products. Bases formed from such concrete may be cured by enclosing them, such as with a tarp (e.g., a 3 millimeter thick plastic sheet), and allowing the cure temperature in or around the bases to reach about 105 to about 135 degrees F. (Fahrenheit).

Other embodiments of anchoring base 200 may be fabricated from ceramic, rubber, plastic, wood, stone, metal, or another suitable material or combination of materials. The additional weight provided by anchoring base 200 reduces the likelihood that rodent bait station assembly 10 will be unintentionally moved or tipped, compared to a bait station alone.

Bait station 100 may include lid 110 and base 120. The lid and base may be integral with each other, and include a "living" hinge, or they may be separate pieces that can be coupled together. Some embodiments include key 160, and are configured to lock lid 110 to base 120 in a closed position to restrict access to bait 140 within bait station 100. Some embodiments are configured such that lid 110 can be unlocked from bait station 100 using the key.

Referring to FIGS. 1A-1B and 2A-2B, some embodiments of anchoring base 200 and bait station 100 may have substantially the same shape. In this respect, the shape resulting from projecting the outer perimeter of anchoring base 200 onto the plane of anchoring base top surface 210 may be substantially the same as the shape resulting from projecting the outer perimeter of the bait station 200 onto the same plane.

In some embodiments, projecting the outer perimeter of anchoring base 200 onto the plane of anchoring base top surface 210 circumscribes an area that is about 150% or less of the area circumscribed by projecting the outer perimeter of bait station 200 onto the same plane. For example, the projection of the perimeter of anchoring base 200 onto the plane of anchoring base top surface 210 may circumscribe an area that is equal or less than 100, 101, 102, 103, 104, 105, 106, 107, 108, 109, 110, 111, 112, 113, 114, 115, 120, 125, 130, 135, 140, 145, or 150 percent of the area circumscribed by the projection of the perimeter of bait station 100 onto the plane of anchoring base top surface 210.

Figure 3:
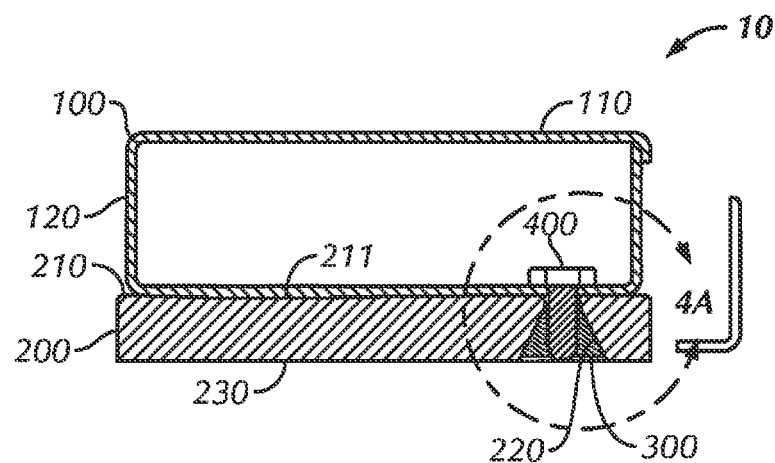
FIG. 3 is a cross-sectional view of the embodiment of FIG. 1A, taken along line 3-3.
Figure 4A:
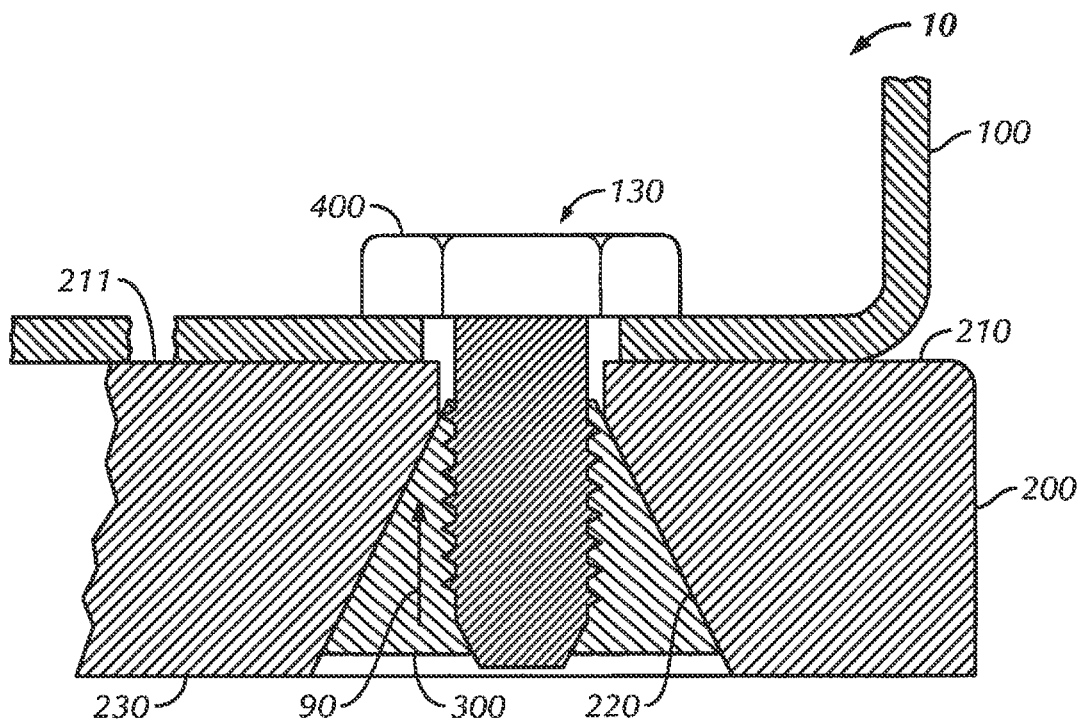
FIG. 4A is a detailed cross-sectional view of attachment piece 300, anchoring base attachment surface 220, and fastening member 400 of the embodiment of FIG. 1A. The detailed area shown in FIG. 4A is denoted as 4 in FIG. 3.

Referring to FIGS. 3 and 4A, fastening member 400 and attachment piece 300 are respectively coupled (one-to-one coupled) to fix bait station 100 (at bait station attachment location 130) to portion 211 of anchoring base top surface 210 of anchoring base 200. In the embodiment depicted, fastening member 400 is a self-tapping screw, such as a lag screw. In this embodiment, attachment piece 300 is a fastening plug (labeled as fastening plug 410 in embodiments where a tray is part of the assembly, such as in FIG. 6), which is fabricated from plastic and has a through hole having a slightly smaller diameter than the thread major diameter of self-tapping screw fastening member 400. During the coupling of fastening member 400 and attachment piece 300, the self-tapping threads of fastening member 400 cut mating threads into attachment piece 300 as fastening member 400 advances along the inner bore of the through hole of attachment piece 300.

One of ordinary skill in the art, with the benefit of this disclosure, will appreciate that, in other embodiments of the present assemblies, attachment piece 300 may be coupled to fastening member 400 in other ways. For example, fastening member 400 may be a machine screw, and attachment piece 300 may be fabricated with mating threads. Also, in some embodiments, attachment piece 300 may be fabricated from material other than plastic (e.g., metal). Other embodiments of the present assemblies may use attachment piece 300 and fastening member 400 that mate by way of a quarter-turn fastening mechanism. Still other embodiments may use attachment piece 300 that has an externally threaded portion that extends through anchoring base 200, and bait station 100, and couples to fastening member 400 that has internal threads, such as a nut.

FIGS. 4B-4G depict examples of other embodiments of the present assemblies in which bait station 100 is coupled to anchoring base 200 in other ways from what is shown in FIG. 4A. In the embodiment shown in FIG. 4B, fastening member 400 is a bolt (e.g., a bolt or a screw) and attachment piece 300 is a mating nut.

Figure 4B:
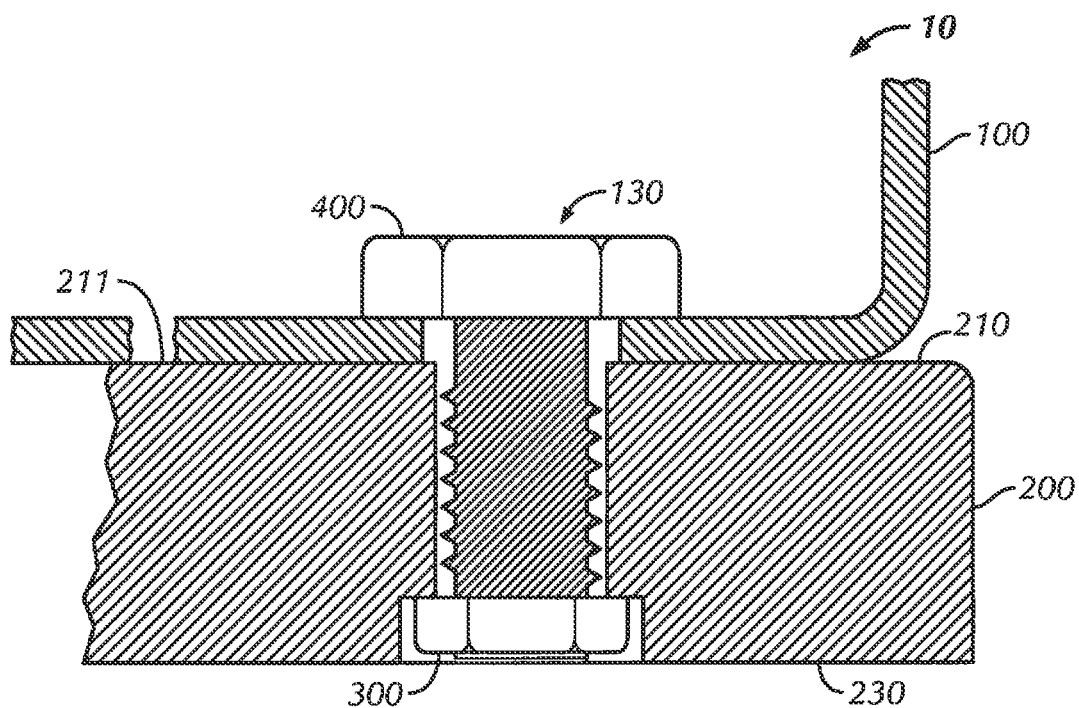
FIGS. 4B-4G are detailed cross-sectional views of alternate embodiments to the embodiment shown in FIG. 4A.
Figure 4C:
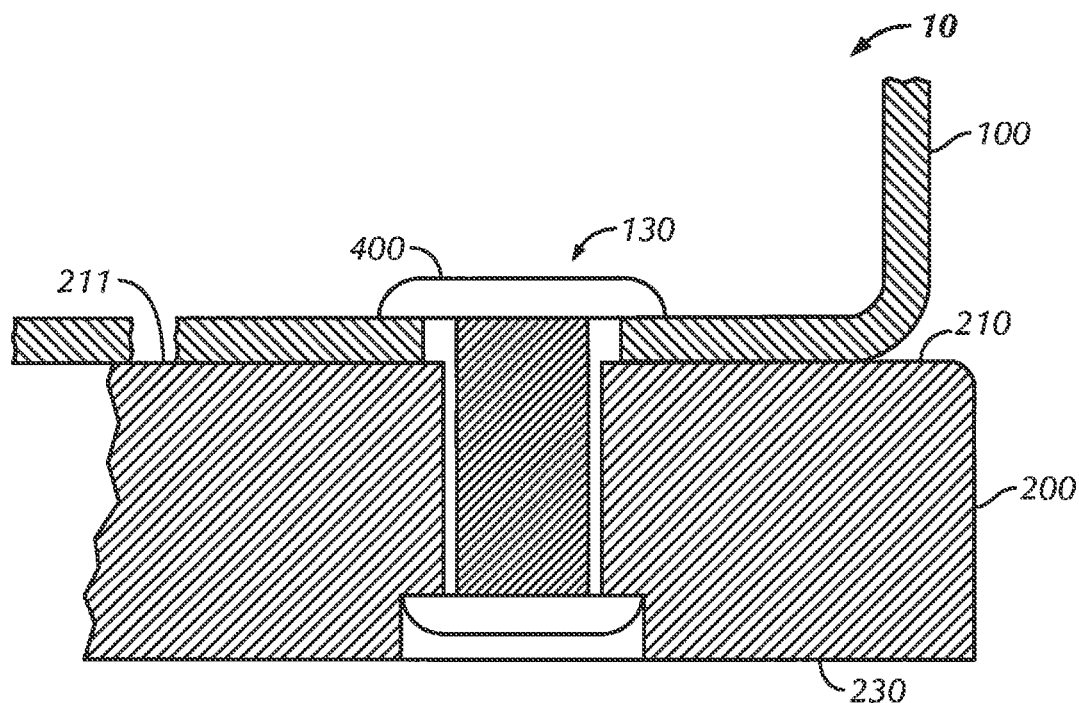
Figure 4D:
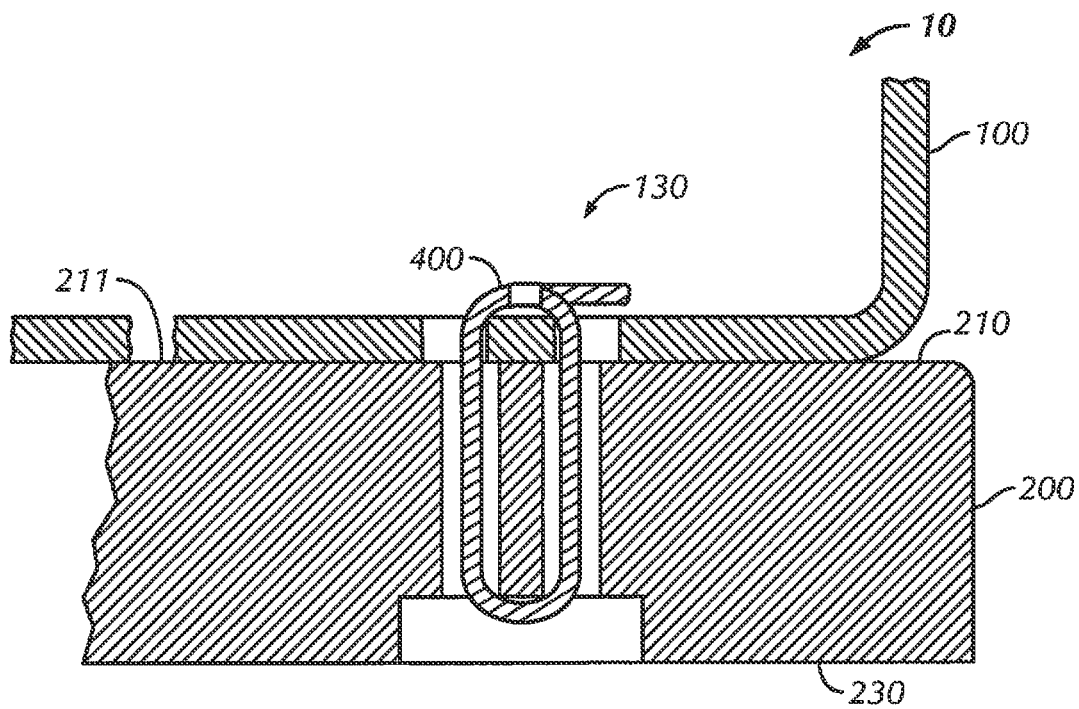
Figure 4E:
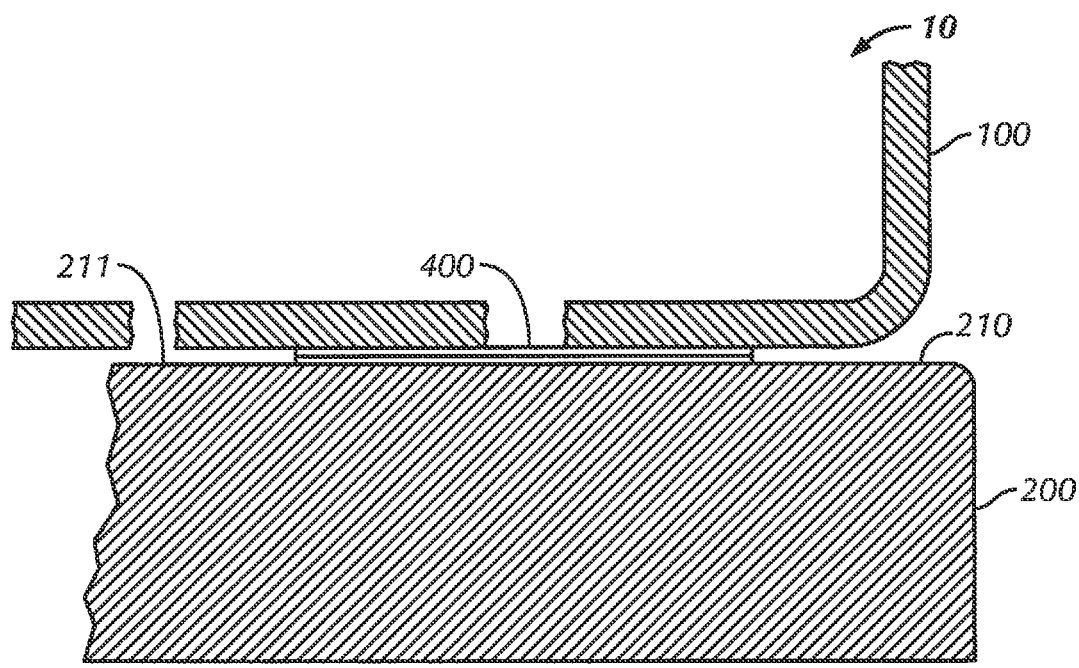

Attachment piece 300 is not part of the embodiments shown in FIGS. 4C-4E. FIG. 4C depicts fastening member 400 that is a rivet, such as a solid rivet or a blind rivet. The rivet may be plastic, and may have radially protruding ridges or threads (not shown) that increase the friction force between the rivet and the wall of the passageway in base 200. In FIG. 4D, fastening member 400 may be one or more cable ties (e.g., half-inch cable ties), each of which is threaded through matching pairs of holes in bait station 100 and anchoring base 200. The pairs of holes may be positioned in any suitable location in the station and the base. For example, in some embodiments, the pairs of holes that comprise a matching pair of holes may be located very near each other, as is depicted in FIG. 4C. In other embodiments, a longer cable tie may be used and the pairs of holes that comprise a matching pair of holes may be farther apart, such as the hole locations depicted in FIGS. 2A, 2B, and 7.

FIG. 4E depicts an embodiment in which bait station 100 may be coupled to anchoring base 200 using fastening member 400 that is an adhesive, two-sided tape, or that includes hook-and-loop fasteners.

The embodiments depicted in FIGS. 4B-4D include a counterbore in anchoring base bottom surface 230 to provide clearance for attachment piece 300 and/or fastening member 400. In some embodiments, the counterbore may be configured to correspond to the shape of attachment piece 300 and/or fastening member 400 (e.g., a hexagonal counterbore to correspond to attachment piece 300 that is a hexagonal nut).

Figure 4F:
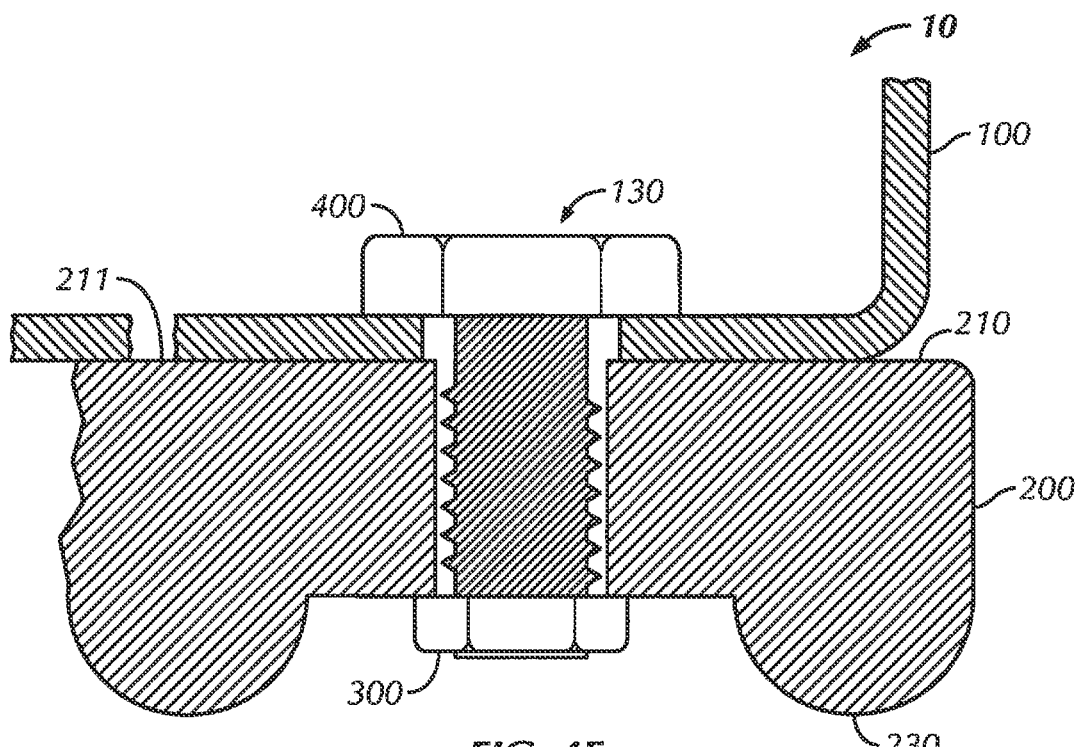

FIG. 4F depicts an embodiment that does not have a counterbore. Instead, bottom surface 230 includes surface features such as, for example, ridges or ribs, that are configured such that when rodent bait station assembly 10 is deployed (e.g., placed in a location and orientation for use as a rodent bait station), bottom surface 230 contacts the deployment surface (e.g., the ground or the floor of a building), and attachment piece 300 and fastening member 400 do not contact the deployment surface.

Figure 4G:
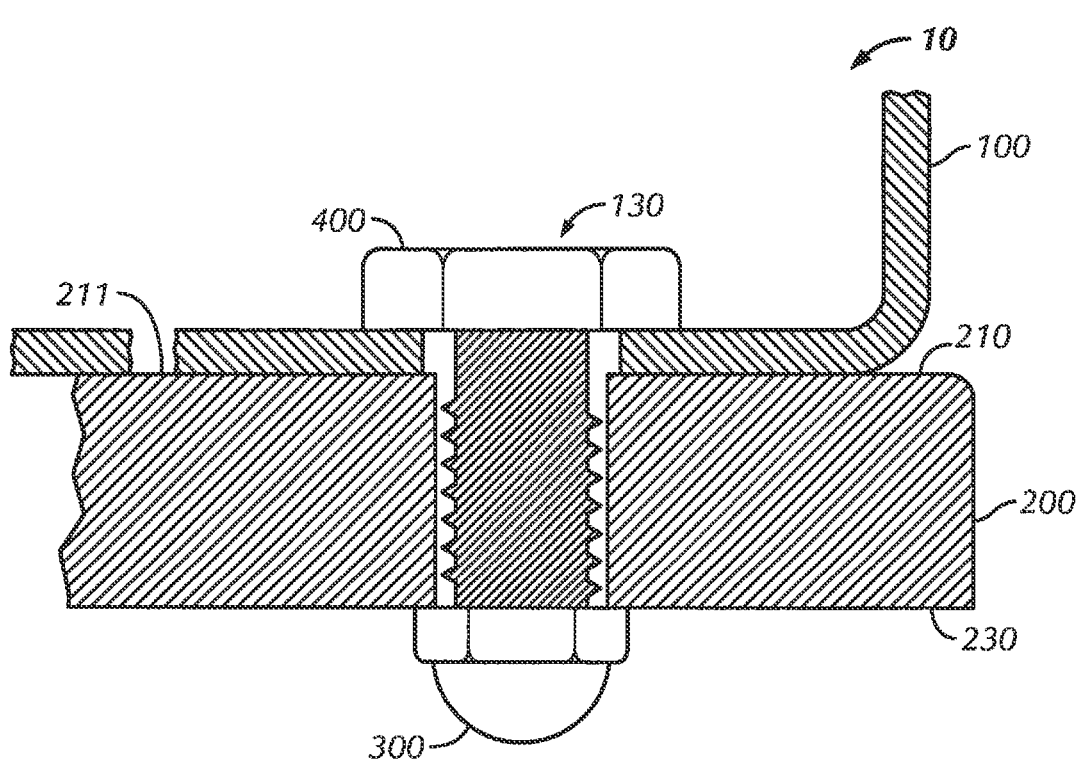

In other embodiments, such as the one shown in FIG. 4G, attachment piece 300 and/or fastening member 400 may contact the deployment surface. In some of these embodiments, attachment piece 300 and/or fastening member 400 may be configured with features for contacting the ground. For example, fastening member 400 may be a threaded bolt and attachment piece 300 may be a rubber or plastic "foot" that contains mating threads.

In some embodiments, both attachment piece 300 and fastening member 400 may be configured to be located exterior to the volume defined by bait station 100. This may be accomplished by the use of, for example, a mounting flange on bait station 100, or brackets that couple to a side of bait station 100 and to anchoring base 200.

Referring to FIG. 4A, the coupling of attachment piece 300 and fastening member 400 may result in compressive force 90 being applied by attachment piece 300 to anchoring base 200, thereby fixing anchoring base 200 to bait station 100. Attachment piece 300 may contact anchoring base 200 at anchoring base attachment surface 220. In the depicted embodiment, anchoring base attachment surface 220 and attachment piece 300 are frusto-conical in shape (shaped like a frustum, or cone, with the top portion removed). This may facilitate simplified alignment during assembly, and allow attachment piece 300 to be drawn into anchoring base attachment surface 220 of anchoring base 200 as fastening member 400 is coupled to attachment piece 300.

Figure 7:
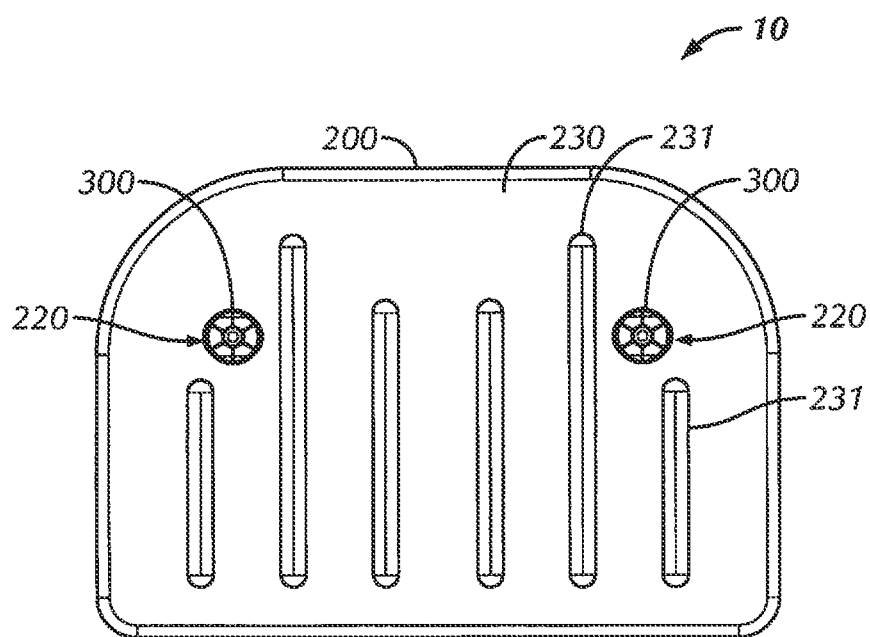

Some embodiments include features that prevent rotation of attachment piece 300 during coupling to fastening member 400. Such anti-rotational features may include, for example, a configuration having a slightly eccentric radial cross-section (e.g., an oblong-shaped cross-section) of a generally frusto-conical attachment surface 220 of anchoring base 200. When such a configuration is coupled to a frusto-conical fastening plug serving as attachment piece 300, the fastening plug may deform to comply with the eccentric cross-section of attachment surface 220, thereby limiting the rotation of the fastening plug. FIG. 7 is a bottom view depicting a fastening plug positioned within an oblong attachment surface 220. Other embodiment may include attachment piece 300 and/or anchoring base attachment surface 220 that are not frusto-conical in shape.

Referring to FIGS. 1B, 2B, 5B, and 6, some embodiments of the present rodent bait station assemblies include attachment tray 350, which may serve to partially enclose anchoring base 200. Partially enclosing anchoring base 200 may serve to protect, and to contain fragments of, embodiments of anchoring base 200 that are prone to breaking or fragmenting (e.g., embodiments comprising concrete). Enclosure of anchoring base 200 may also provide improved aesthetics.

In some embodiments, attachment piece 300 is part of attachment tray 350. In some of these embodiments, the coupling of fastening member 400 to attachment piece 300 (and therefore to attachment tray 350) does not involve direct contact between fastening member 400 and attachment piece 300, but instead is accomplished using a fastening plug 410 that is in contact with both fastening member 400 and attachment piece 300.

Figure 5A:
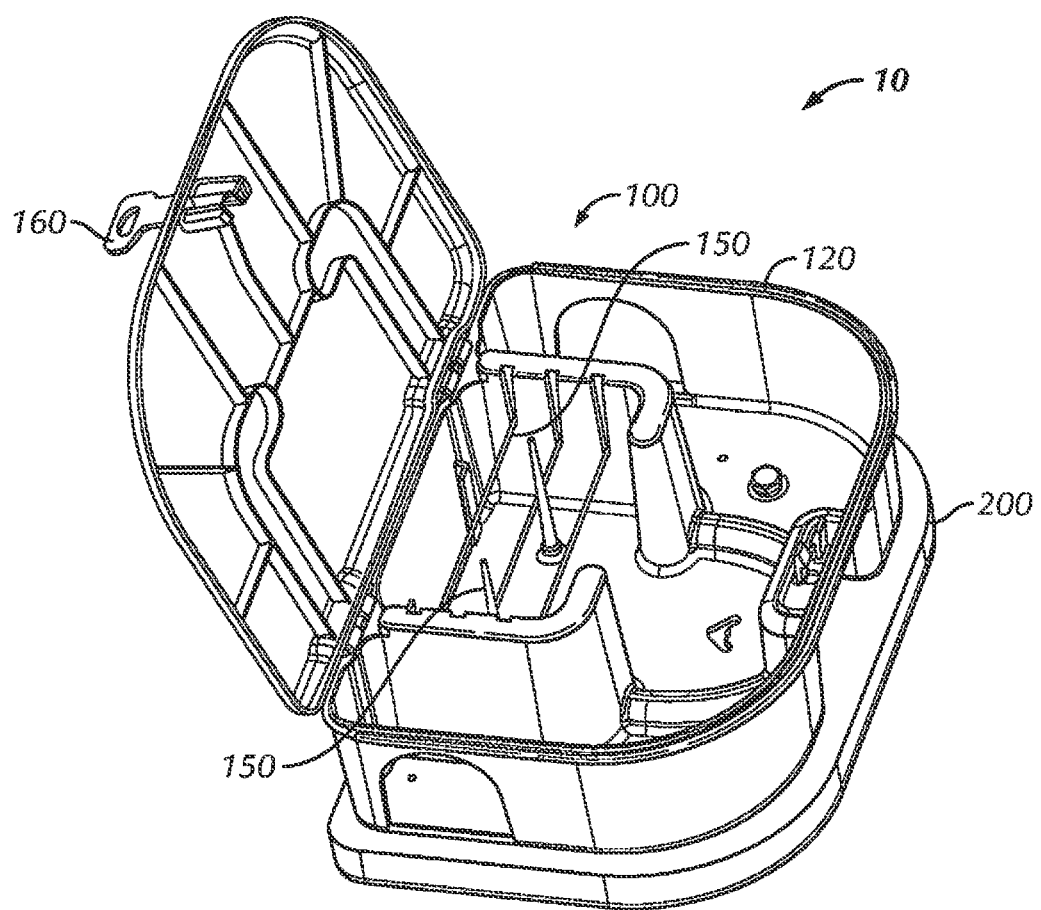
Figure 5B:
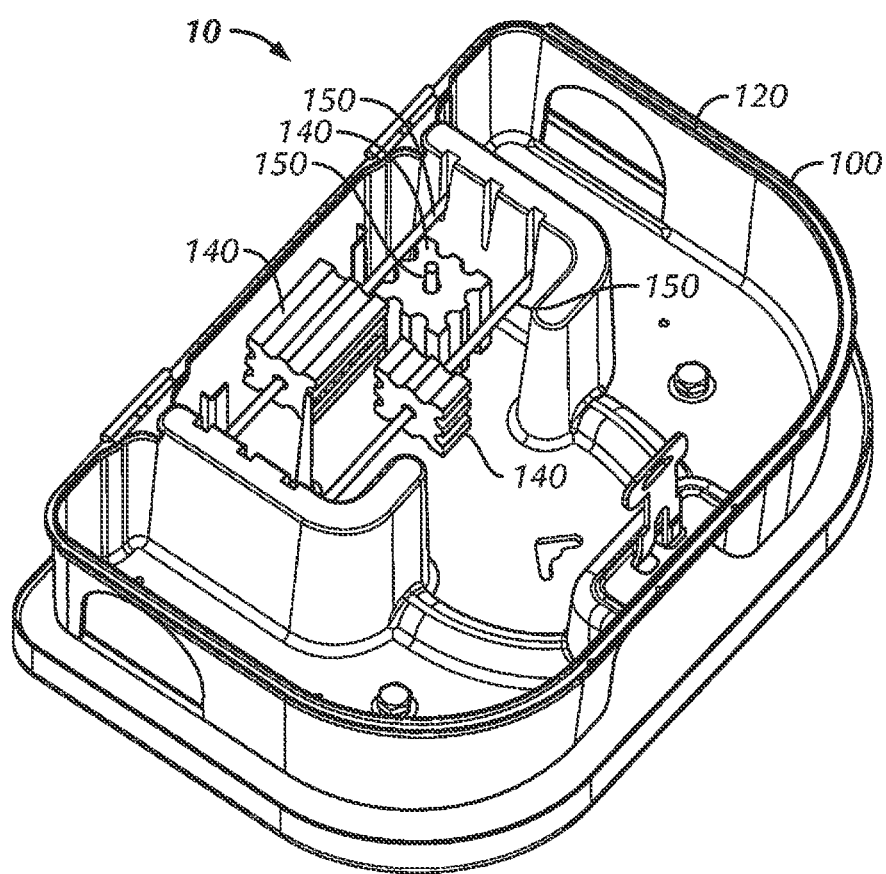
Figure 6:
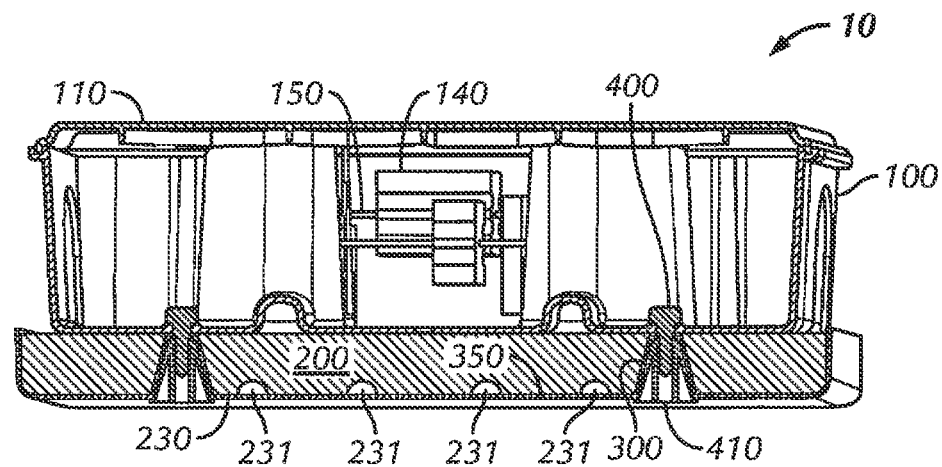

Referring to FIGS. 5A, 5B, and 6, bait 140 may be held in place within bait station 100 by bait-holding rods 150, which may be constrained within bait station 100 by physical means such as, for example, slots configured to constrain holding rods 150. One of ordinary skill in the art will appreciate that other methods of constraining bait 140 may be used in other embodiments of the present disclosure.

Indented feature 231 located on anchoring base bottom surface 230 of some embodiments of anchoring base 200 is depicted in FIG. 6 and FIG. 7. Indented feature 231 may serve to reduce the amount of material and the weight of anchoring base 200. In embodiments that do not include attachment tray 350, indented feature 231 may serve the additional purpose of increasing resistance to sliding for a deployed rodent bait station assembly 10. The embodiment depicted in FIGS. 6-7 have indented feature 231 that is a channel. Those of ordinary skill in the art will recognize that many other geometries are possible (e.g., a waffle-like grid).

Figure 8:
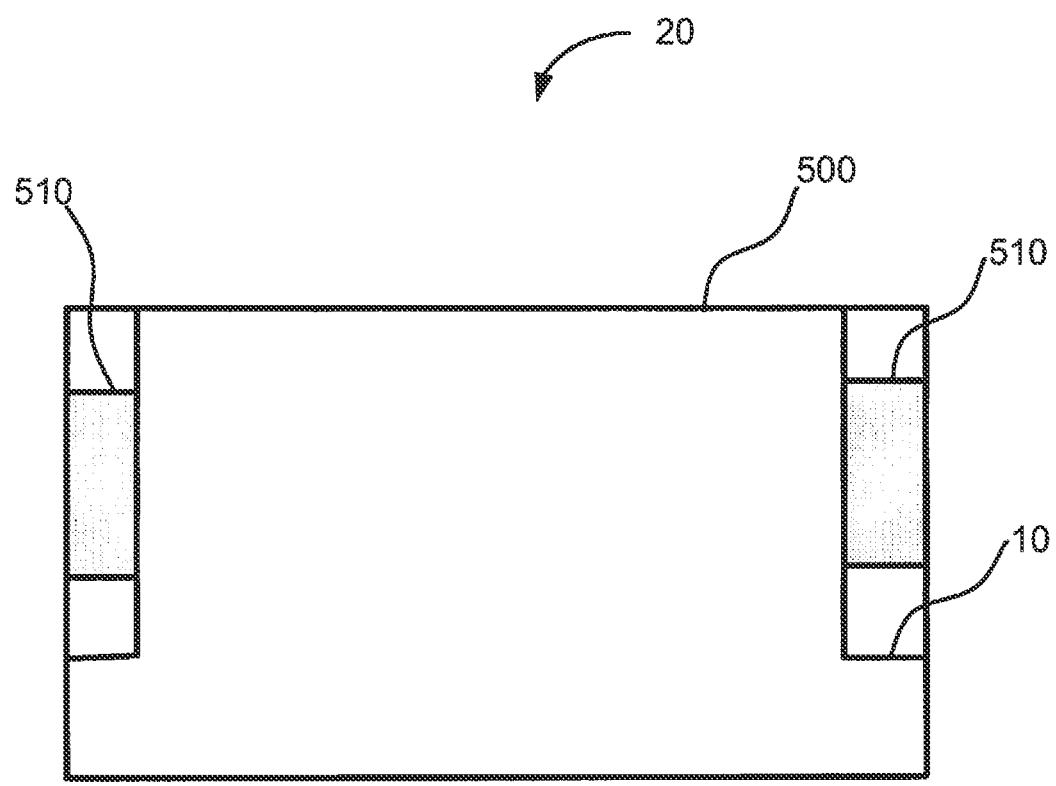
FIG. 8 depicts an embodiment of a present rodent bait station packaged bundle, having an embodiment of a rodent bait station assembly (depicted generically) packaged within a packaging container.

An embodiment of the present rodent bait station packaged bundles is depicted in FIG. 8. In this embodiment rodent bait station packaged bundle 20 includes rodent bait station assembly 10 contained within packaging container 500. Packaging container 500 may be fabricated using paper, such as paperboard (e.g., non-corrugated boxes), corrugated fiberboard (e.g., corrugated cardboard boxes), plastic (e.g., plastic packaging), or any other suitable packaging material. Embodiments of packaging container 500 may include a combination of materials (e.g., blister packs that include formed plastic as well as paperboard). Some embodiments of rodent bait station packaged bundle 20 may include packaging container 500 that is a shrink-wrap plastic film. Packing material 510 may also be included within packaging container 500 to protect rodent bait station assembly 10 from possible damage incurred during shipping. Examples of packing material 510 include bubble wrap and polystyrene foam.

Figure 9:
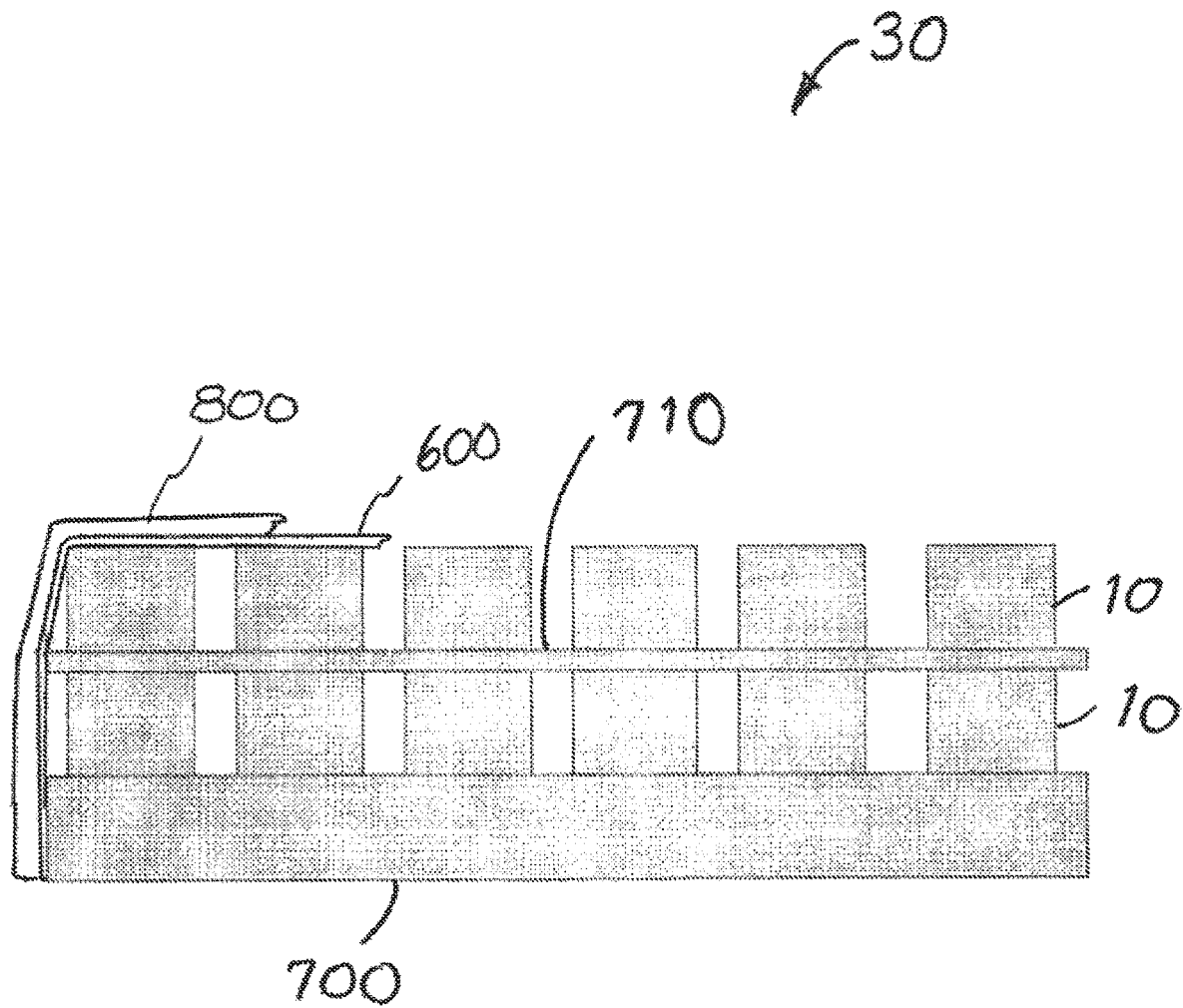
FIG. 9 depicts an embodiment of a present shipping bundle, having a plurality of present rodent bait station packaged bundles on a transport pallet.

An embodiment of the present shipping bundle 30 is depicted in FIG. 9. In this embodiment, several rodent bait station assemblies 10 (depicted generically) are positioned on transport pallet 700. Multiple rows of rodent bait station assembly 10 may be positioned on transport pallet 700, and layer stacking material 710 may be used as a separator between the individual rows of rodent bait station assemblies 10. Transport pallet 700 may be a wooden pallet, a plastic pallet, or any other suitable pallet or skid that can be used to aid in shipping large numbers of products such as rodent bait station assemblies 10. The individual rodent bait station assemblies 10 that are part of shipping bundle 30 may or may not be individually packaged within rodent bait station packaged bundles 20. In some embodiments of shipping bundle 30, plastic film 600 and/or strap 800 may be used to tie down the individual rodent bait station assemblies 10 to transport pallet 700, so as to restrict the movement of individual rodent bait station assemblies 10 relative to each other. Furthermore, bundle 30 may include a film that is wrapped around multiple groups of assemblies that have been wrapped together with a similar film, thus creating a large bundle comprising multiple smaller bundles that each comprise multiple assemblies 10. For example, in some embodiments, bundle 30 comprises 240 total assemblies 10 wrapped with a film and grouped as follows: four stacked (one on top of the other) smaller bundles that each includes a pallet (e.g., 40 inches by 48 inches) on which four stacked layers of 15 assemblies 10 each have been positioned and wrapped with a film, where two of the smaller bundles that are stacked and that each comprises 60 assemblies have also been wrapped with a film to form an intermediate bundle, and the two intermediate bundles are stacked on each other to form the embodiment of bundle 30 that comprises the 240 total assemblies 10.

Figure 10:
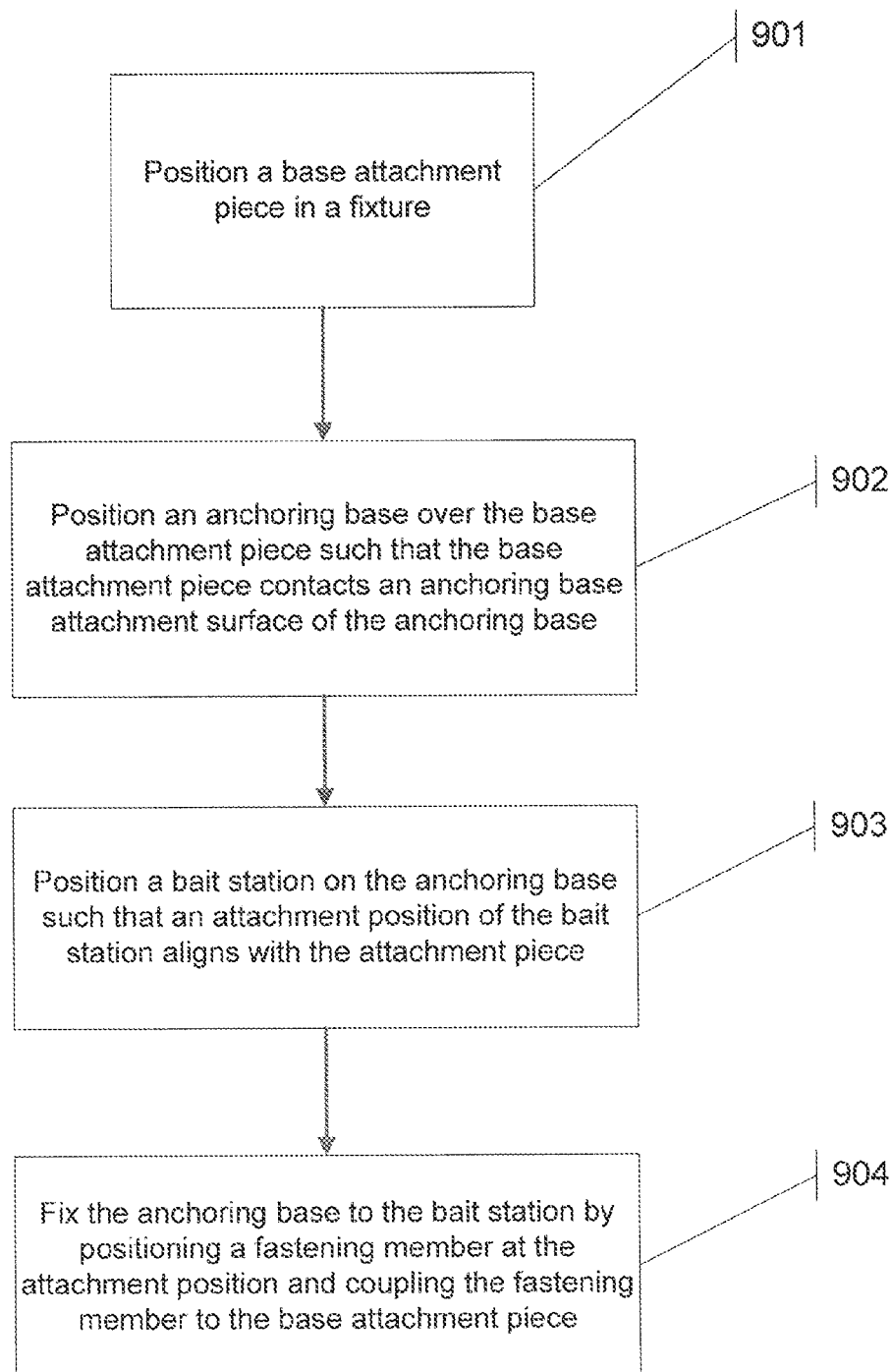
FIG. 10 is a flow chart showing an embodiment of a method for assembling a rodent bait station assembly.

FIG. 10 presents a flow chart of the steps involved in an embodiment of the present methods for assembling a rodent bait station assembly. This embodiment includes positioning a base attachment piece (e.g., attachment piece 300) in a fixture (step 901), positioning an anchoring base (e.g., anchoring base 200) over the base attachment piece such that the base attachment piece contacts an anchoring base attachment surface (e.g., anchoring base attachment surface 220) of the anchoring base (step 902), positioning a bait station (e.g., bait station 100) on the anchoring base such that an attachment position (e.g., bait station attachment location 110) of the bait station aligns with the attachment piece (step 903), and fixing the anchoring base to the bait station by positioning a fastening member (e.g., fastening member 400) at the attachment position and coupling the fastening member to the base attachment piece (step 904). These steps may be performed manually by an operator, by an operator with the aid of assembly automation equipment, and/or by a fully automated assembly system. One of ordinary skill in the art will appreciate that the "fixture" of step 901 may be any device that is used for holding parts in one or more positions during an assembly process using those parts.

Figure 11:
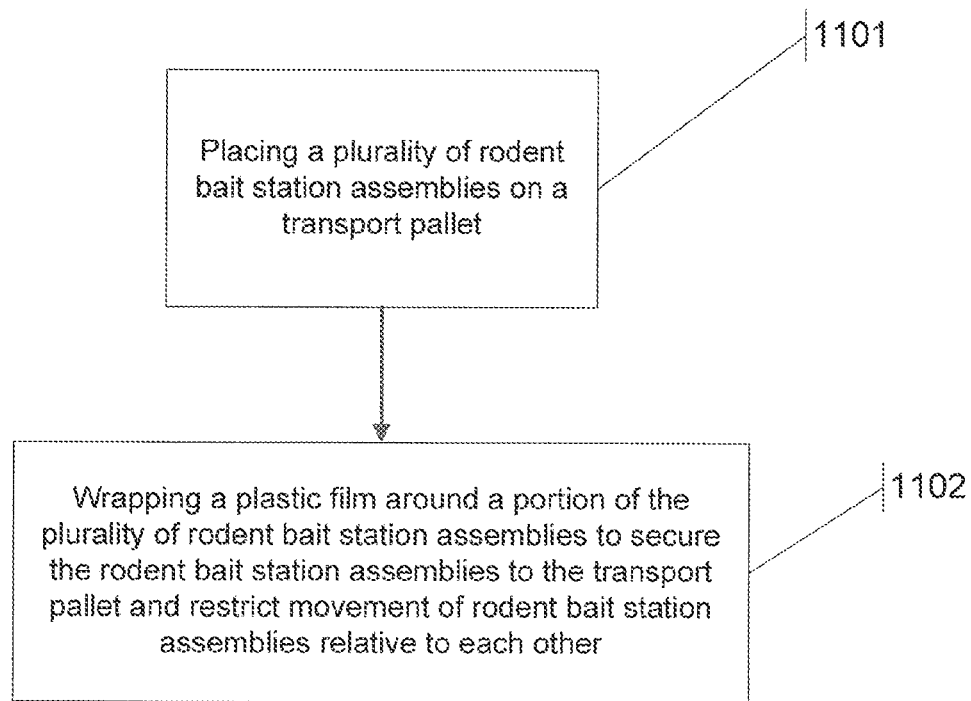
FIG. 11 is a flow chart showing an embodiment of a method for bundling a plurality of rodent bait station assembly.

FIG. 11 presents a flow chart of the steps involved in an embodiment of the present method for bundling a plurality of rodent bait station assemblies for shipment. This embodiment includes placing a plurality of rodent bait station assemblies (e.g., rodent bait station assembly 10) on a transport pallet (e.g., transport pallet 700) (step 1101) and wrapping a plastic film (e.g., plastic film 600) around a portion of the plurality of rodent bait station assemblies to secure the rodent bait station assemblies to the transport pallet and restrict movement of rodent bait station assemblies relative to each other (step 1102). Such wrapping may be accomplished using, for example, a conventional stretch wrap machine.

Descriptions of well known assembly techniques, components, and equipment have been omitted so as not to unnecessarily obscure the present methods, apparatuses, an systems in unnecessary detail. The descriptions of the present methods and apparatuses are exemplary and non-limiting. Certain substitutions, modifications, additions and/or rearrangements falling within the scope of the claims, but not explicitly listed in this disclosure, may become apparent to those of ordinary skill in the art based on this disclosure. For example, some embodiments may use attachment piece 300 that has an externally threaded portion that extends through anchoring base 200, and bait station 100, and couples to fastening member 400 that has internal threads, such as a nut. Some embodiments may include attachment piece 300 and/or anchoring base attachment surface 220 that are not frusto-conical in shape.

The appended claims are not to be interpreted as including means-plus-function limitations, unless such a limitation is explicitly recited in a given claim using the phrase(s) "means for" and/or "step for," respectively.

The invention claimed is:

1. A rodent bait station packaged bundle comprising:
a pallet;
multiple rodent bait station assemblies positioned on the pallet, where the multiple rodent bait station assemblies are positioned on the pallet such that the pallet supports the multiple rodent bait station assemblies, each of the multiple rodent bait station assemblies comprising:
   a base comprising plastic;
   a lid comprising plastic and including an inner surface and internal wall portions extending away from the inner surface, the lid being lockable in a closed position relative to the base;
   an anchoring base comprising concrete that is pre-molded to correspond to at least one feature of the bait station assembly; and
   a tray configured to be coupled to the base such that the base and tray cooperate to enclose a majority of the anchoring base; and
a film wrapped around a portion of the multiple rodent bait station assemblies.

2. The rodent bait station packaged bundle of claim 1, where, for each of the multiple rodent bait station assemblies, the base is integrally hinged to the lid.

3. The rodent bait station packaged bundle of claim 1, further comprising a key coupled to one of the multiple rodent bait station assemblies.

4. The rodent bait station packaged bundle of claim 1, wherein the at least one feature of the bait station assembly includes a curved portion of a perimeter of the bait station assembly and the anchoring base includes a first curved portion that corresponds to the curved portion of the perimeter of the bait station assembly.

5. The rodent bait station packaged bundle of claim 1, wherein at least one of the multiple rodent bait station assemblies are disposed within a container that is positioned on the pallet.

6. A rodent bait station packaged bundle comprising:
a pallet;
multiple rodent bait station assemblies positioned on the pallet, where the multiple rodent bait station assemblies are positioned on the pallet such that the pallet supports the multiple rodent bait station assemblies, each of the multiple rodent bait station assemblies comprising:
   a base comprising plastic;
   a lid comprising plastic and including an inner surface and internal wall portions extending away from the inner surface, the lid being lockable in a closed position relative to the base;
   an anchoring base comprising concrete that is pre-molded to correspond to at least one feature of the bait station assembly; and
   a tray configured to be coupled to the base such that the base and tray cooperate to enclose a majority of the anchoring base; and
a strap wrapped around a portion of the multiple rodent bait station assemblies.

7. The rodent bait station packaged bundle of claim 6, where, for each of the multiple rodent bait station assemblies, the base is integrally hinged to the lid.

8. The rodent bait station packaged bundle of claim 6, wherein at least one of the multiple rodent bait station assemblies are disposed within a container that is positioned on the pallet.

9. The rodent bait station packaged bundle of claim 8, where the container comprises paper.

10. A rodent bait station packaged bundle comprising:
a pallet;
multiple rodent bait station assemblies positioned on the pallet, where the multiple rodent bait station assemblies are positioned on the pallet such that the pallet supports the multiple rodent bait station assemblies, each of the multiple rodent bait station assemblies comprising:
   a base comprising plastic;
   a lid comprising plastic and including an inner surface and internal wall portions extending away from the inner surface, the lid being lockable in a closed position relative to the base;
   an anchoring base that is pre-molded to correspond to at least one feature of the bait station assembly; and
   a tray configured to be coupled to the base such that the base and tray cooperate to enclose a majority of the anchoring base; and a packaging container wrapped around a portion of the multiple rodent bait station assemblies.

11. The rodent bait station packaged bundle of claim 10, where at least one of the multiple rodent bait station assemblies comprises multiple bait-holding rods configured to be enclosed by the lid and the base when the lid and the base are locked together.

12. The rodent bait station packaged bundle of claim 10, where the base of the multiple rodent bait station assemblies is coupled to the anchoring base via a fastening member.

13. The rodent bait station packaged bundle of claim 10, where the packaging container comprises a plastic film.

14. The rodent bait station packaged bundle of claim 10, where the packaging container comprises a paper container.

15. The rodent bait station packaged bundle of claim 10, where the anchoring base comprises concrete.

* * * * *